Nov. 19, 1968        E. K. PARKER ET AL        3,412,332
POINTER LOCK FOR ELECTRICAL INDICATING INSTRUMENTS
Filed Sept. 9, 1965

INVENTORS.
ELMER K. PARKER AND
MALCOLM E. SCHUMANN, JR.
BY
Mattern, Ware and Davis
ATTORNEYS.

United States Patent Office 3,412,332
Patented Nov. 19, 1968

3,412,332
POINTER LOCK FOR ELECTRICAL
INDICATING INSTRUMENTS
Elmer K. Parker, Portchester, N.Y., and Malcolm E. Schumann, Jr., Greenwich, Conn., assignors to Parker Instrument Corporation, Stamford, Conn.
Filed Sept. 9, 1965, Ser. No. 486,179
14 Claims. (Cl. 324—157)

This invention relates to a pointer lock for electrical indicating instruments, and is particularly concerned with panel meters, for example, of the type for measuring direct current in milliamperes.

Under certain conditions it may be desired to allow the meter to operate normally with fluctuations in current and to lock the pointer at a particular reading for the purpose of making a written notation, photographing, or otherwise recording the meter reading, and it is proposed according to the invention to provide a pointer lock to effectually accomplish this function. Under other conditions it may be desired to normally lock the meter against movement and to unlock it to permit its actuation to indicate a meter reading, and to thereupon either re-lock it to maintain it at such reading or unlock it to allow it to be actuated normally. Thus the invention contemplates either a pointer lock which may be actuated to lock a normally free moving pointer, or a pointer lock which normally locks the pointer and upon actuation permits its free movement to indicate the electrical value of the current being measured.

Panel meters are normally fixed in relation to related apparatus, and it is desirable that the locking function be manually controlled at a convenient reading distance from the meter and also that the hands of the operator controlling the locking operation and making records of the meter readings be free to efficiently perform these functions. To the end of accomplishing this desirable result it is proposed to provide a locking means within the meter and a remote control means for actuating the locking means in the form of an elongated flexible cable, such for example as employed in photography for actuating a camera shutter.

It is especially proposed to employ a flexible cable assembly of the type having a swivel fitting at one end which may be quickly and easily attached to the meter or removed therefrom, a flexible cable carried within a tubular flexible sheath and provided at the meter end with a pin or plunger having a cam tip for actuating the locking means and provided at its free end with a spring loaded thumb pressed button for projecting the plunger, which, upon depression, projects the plunger against the spring load, and which is further provided with a uni-directional clutch or latching means which upon being set locks the thumb piece and the flexible cable against retroactive movement in any projected position, and which upon release permits free spring loaded projection and retraction movement.

It is further proposed to provide a pointer lock especially adapted for cooperation with a meter of the type as disclosed in the patents to Louis W. Parker, No. 2,773,239, Dec. 4, 1956, No. 3,055,923, Oct. 2, 1962, and No. 3,133,249, May 12, 1964, wherein the pointer is carried upon a thin pivoting rotor disk. As described in Electronic Design News for September 1963, these Parker meters incorporate as the rotor coil of the meter movement a thin wafer or disk of metallic sheet or foil on which the entire d'Arsonval coil of the indicating meter is formed in one or more thin sheet configurations, applied by such means as printed circuit techniques to one or both faces of the disk. These thin wafer rotor disks may also incorporate laminations of oxides or platsic materials for strengthening or otherwise improving their characteristics.

Such thin flat rotors provide meter movements of extreme thinness, coupled with rugged resistance to heavy physical shocks and immunity from external magnetic flux, since the thin flat rotor disk may be sandwiched between the permanent annular magnet of the instrument and a magnetic flux path-closing yoke, which thus effectively shields the meter coil from all outside magnetic influences.

Because of the extreme thinness of the pointer carrying rotor wafer or disk and its very delicate mounting upon substantially frictionless bearings, usually jewel bearings such as employed in watches, the difficult problem is presented of providing an effective manually controlled brake or locking means to engage the delicately mounted and balanced wafer or disk which will not at the same time exert torsional or bending strains upon the disk and its bearings which might impair its proper functioning.

It is a further object of the invention to provide a lock means in the form of a brake shoe which, without regard to the manual actuating force applied by the operator, will engage the periphery of the disk with a delicately applied gradually increasing pressure with its braking force directed in the plane of the disk and normal to its pivot axis. To this end it is proposed to provide in the preferred embodiment of the invention a leaf spring fixedly mounted at one end and arranged to have movement parallel to the plane of the disk, and provided at its free end with an arched hair spring disposed in a plane perpendicular to the plane of the disk and radial to its pivot axis, and which acts as a yieldable brake shoe to engage or disengage the periphery of the disk with gradually increasing or decreasing pressure as the leaf spring is moved inwardly or outwardly with respect to the disk.

It is further proposed to mount the leaf spring within the meter in relation to be engaged by the cam tip of the pin or plunger of the flexible cable control means, whereby as the plunger is projected the leaf spring is moved out of its normal position and into either disk braking or releasing position, depending upon the particular aspect of the invention embodying the type of control desired. In one case, for example with the plunger disposed to engage at the side of the leaf spring opposite from the disk side, the hair spring will be normally out of engagement with the disk and upon actuation of the plunger will be moved against the inherent springiness of the combined leaf and hair springs into engagement with the disk. In the other case, with the plunger disposed to engage at the other or disk side of the leaf spring, the inherent springiness of the combined leaf and hair springs will maintain the hair spring in locking relation with the disk and upon actuation of the plunger the hair spring will be moved out of engagement with the disk against the inherent springiness of the springs.

A further object is to provide an arched hair spring for engagement with the periphery of the rotor disk and which is so mounted that its flexing when engaged under pressure with the disk will take place in a direction parallel to the plane of the disk and without shifting its point of contact therewith, so that there is no tendency for the spring to create a frictional force perpendicular to the plane of the disk tending to warp or distort the disk out of its plane thus effecting a change in meter reading as the spring is deflected.

Other and more specific objects will be apparent from the features, elements, combinations and operating procedures disclosed in the following detailed description and shown in the drawings, in which:

FIG. 1 is a front elevation of a panel switch incorporating one embodiment of the invention wherein the locking spring means is normally out of locking engagemet with the disk, the dot-and-dash lines indicating the locked position;

FIG. 2 is a vertical sectional view taken along the line 2—2 of FIG. 1.

FIG. 3 is a vertical sectional view on an enlarged scale taken along the line 3—3 of FIG. 1, the full lines indicating the retracted position of the plunger and the normal position of the leaf spring, and the dot-and-dash lines indicating the projected position of the plunger and the actuated position of the leaf spring;

FIG. 4 is a fragmentary perspective view on an enlarged scale of the rotor disk and the locking means engaged therewith;

FIG. 5 is an enlarged end view of the lead spring and hair spring according to one embodiment of the invention, wherein the two ends of the hair spring are secured, the dot-and-dash lines showing the deflected position of the hair spring when engaged with the disk;

FIG. 6 is a similar view showing a modified spring arrangement wherein the hair spring is secured at one end only, the other end being free, the dot-and-dash lines showing the deflected position of the hair spring when engaged with the disk;

FIG. 7 is a fragmentary perspective view of a modified spring having a cam portion; and FIG. 8 is a fragmentary front elevation of a modified form of the invention wherein the locking spring means is normally in locking engagement with the disk, the dot-and-dash lines indicating the released position.

Referring to the drawings and particularly to FIGS. 1 and 2 the panel meter illustrated by way of example, in which the pointer lock in accordance with the present invention is embodied, is generally similar to the panel meter disclosed in the aforementioned patent to Louis W. Parker No. 3,055,923, and comprises a thin flat rotor disk 10 of substantially circular configuration provided with a centrally disposed shaft 11 having friction reducing points at each end which are journalled in set screw bearings 12 and 13 mounted upon generally similar inner and outer high permeability magnetic plates 14 and 15 disposed substantially parallel to one another on opposite sides of the rotor disk, with a ring-shaped magnet 16 secured upon the plate 14 in separated relation beneath the plate 15, the rotor disk being free to rotate in the space between the magnet and the plate 15. The pointer 17, which may for example be a nylon bristle, or other light weight material, is secured to a tab projection 18 of the disk and projects radially therefrom for disposition over a scale concentric to the pivotal axis of the disk, as will presently more fully appear.

The plates 14 and 15, the magnet 16, and the rotor disk are assembled as a unit by screws 19, and the unit is secured by screws 20 upon the base 21 of the panel case, the latter including a transparent snap-on cover having an upper planar portion 22 overlying a scale plate 23 and carrying scale markings 24, and a lower outwardly offset or bulged portion 25 overlying the meter unit. While the entire cover is shown as transparent to facilitate illustration, it is pointed out that in practice the cover is molded as an integral piece of plastic material, the upper portion 22 of which is transparent to expose the scale and pointer, while the lower portion 23 and the shoulder 26 separating the upper and lower portions is opaque so that the meter unit is concealed and does not distract from the reading of the meter.

As shown clearly in FIG. 2 the meter is adapted to be conveniently mounted upon a panel 27 constituting part of the apparatus in which the meter is incorporated, and to this end the base 19 is provided with a pair of rearwardly projecting posts 28—28, each having a bolt 29 molded therein with its flanged or headed end exposed at the inner side of the base 21 while its other threaded end is projected rearwardly from the post where it serves both to secure the meter upon the panel and as an electrical terminal for the meter. In mounting the meter upon the panel the two posts are engaged through aperatures 30 in the panel and an insulator sleeve 31 is engaged on each post in abutment with the rear surface of the panel and is held in place by a nut 32 screwed upon the bolt. An electrical connector eyelet 33 may then be placed upon the bolt 29 and held in place by washers 34 and 35 and by an additional nut 36. Leads 37, 38 to the meter unit are soldered to the inner ends of the bolts 29.

While the operative characteristics of the meter, other than the provision of the thin rotor disk carrying the pointer, do not constitute a part of the present invention, it may be briefly pointed out that the meter as fully disclosed in the aforementioned Parker patents employs a thin etched-circuit wafer or disk provided with printed circuit coils in four interconnected sectors, two on each side, for example as illustrated diagrammatically by the coil sectors 39, 40 in FIG. 4, each sector covering an arc less than 180°. The disk is balanced for disposing the pointer at a zero reading by the oppositely acting spiral hair springs 41 and 42 connected at opposite sides of the disk and which also constitute parts of the electrical system involving the coil sectors, the plates 14 and 15, and the ring magnet 16. The balance point is adapted to be adjusted by an arm 43 controlled by a set screw 44 mounted in the cover and provided with an eccentric pin 45 engaged in a slot 46 in the arm. The ring magnet, for example an Alnico–VIII magnet, has two lodes on each side of opposite polarity, N–S on one side and S–N on the other, matched to the coil sectors of the disk, and the plates 14 and 15 constitute a yoke which completes the magnetic field.

The printed circuit coils are so wound on each face of the disk that the coils upon the upper front and lower rear faces are polarized "North" and the upper rear and lower front faces are polarized "South" when current flows through the coils. The "North" and "South" lodes of the permanent ring magnet pass flux through the disk beyond the areas where the coils are located, and therefore the disk tends to rotate in order to align the coils with the flux produced by the magnet. Thus, when direct current passes through the coils, the magnetic poles generated by them on the disk exert a mechanical force against the balancing hair springs and tend to rotate the disk so as to align the coils with the proper poles of the ring magnet, with the result that the movement of the pointer 17 carried by the disk indicates upon the scale 24 the value of the current being measured.

At one side of the meter unit the base 19 of the casing has mounted upon its inner side a post 47 having its axis parallel to the pivotal axis of the disk 10 and provided with a reduced threaded shank 48 engaged through a hole 49 in the base and secured by a lock washer 50 engaged with the outer side of the base and a nut 51 screwed upon the shank. A washer 52 is interposed between the shoulder end of the post and the inner surface of the base. A diametric slot 53 is provided in the post in which there is engaged the end of a leaf spring 54, preferably secured by soldering to the post to thus provide a cantilever anchor support for the spring. The leaf spring is preferably provided intermediate its ends with bends 55 and 56 to impart a degree of stiffness and articulation thereto, and its free end extends in forwardly spaced relation to the periphery of the disk 10 with its longitudinal center line substantially in the central plane of the disk and tangential to the radius line of the pivot axis of the disk disposed transversely across the meter unit. Adjacent its free end the leaf spring has mounted upon its disk side an arched hair spring 57 which, in one modification as shown for example in FIG. 5, is secured at both ends as by soldering at 58 and 59 and is disposed substantially in a vertical plane radial to the pivot axis of the disk 10. The hair spring is preferably a Phosphor bronze or beryllium-copper wire of the order of about 0.010" thick.

When the pointer lock is not energized, the positioning of the leaf and hair springs is such that the hair spring is normally out of engagement with the periphery of the disk 10, whereby upon exertion of lateral pressure upon the outer side of the leaf spring the hair spring will be moved into locking engagement with the periphery of the disk against the inherent springiness of the leaf spring, being disengaged upon release of pressure through outward flexing to the normal position. As shown in FIG. 5 the convexly curved hair spring engages the periphery of the disk substantially at its center point and under pressure from the leaf spring is flexed at its intermediate portion into a concavely curved indented configuration as shown by the dot-and-dash lines. During such engagement there is no substantial frictional movement perpendicularly to the plane of the disk, so that the engagement of the hair spring with the disk takes place without any distortional force thereon. In the modification shown in FIG. 6 the hair spring 57a is secured at one end only, as by soldering as at 60, the other end being free and normally spaced from the leaf spring so that its flexing movement through engagement with the periphery of the disk, as indicated by the dot-and-dash lines, also takes place without any substantial frictional movement perpendicular to the plane of the disk.

At an intermediate point of the leaf spring, preferably substantially midway between the bends 55 and 56, there is mounted upon the base 19 of the casing an externally threaded bearing stud member 61 engaged through a hole 62 in the base, being provided at its inner end with a head 63, preferably of rectangular outline, and having a cylindrical bore 64 so positioned that its axis is parallel to and slightly offset below the outer surface of the hair spring in the normal unflexed position as seen in FIG. 1. The stud is secured by a nut member 65 engaged with the outer side of the base and having a tubular extension 66 projecting outwardly from the stud and internally threaded in continuation of the nut thread to provide a socket fitting to receive the end of the flexible remote control unit 67 for manual actuation of the leaf spring. This unit may conveniently comprise a conventional cable release such as commonly employed in photography for actuating the shutter of a camera, or a fixed release mounted on the meter case. The unit illustrated by way of example comprises a flexible tubular sheath 68 of woven nylon or the like in which a flexible coiled wire cable 69 is longitudinally movable and to one end of which a pin 70 is secured, as by soldering. The pin is slidable in the passage 71 of a fitting 72 secured to one end of the sheath and has rotatably mounted thereon a swivel connector fitting 73 externally threaded as at 74 to engage within the threaded socket of the extention 66 of the nut member 65, and having a passage 75 in line with the passage 71. To the other end of the cable 69 there is secured as by soldering the shank 76 of an actuating plunger having a thumb engaging knob 77 as its outer end. The shank 76 is slidable in the passage 78 of a tubular bearing member 79 upon the rearward portion of which the end of the sheath 68 is engaged and secured by a sleeve member 80 surrounding the bearing member and projecting forwardly therefrom, where it is provided externally with a finger-engaging flange 81 preferably formed of plastic material molded about the sleeve member, and which permits actuation of the cable release by engaging the index and middle fingers beneath the flange while the thumb engages the knob 77 to depress the actuating plunger. A helical compression spring 82 is engaged about the cable 69 between the inner end of the actuating plunger 76 and a shouldered formation 83 at the inner end of the bearing member 79 and normally projects the actuating plunger at one end of the cable and retracts the pin 70 at the other end, so that in the normal operation of the cable release inward pressure upon the knob 77 projects the pin 70 and when released the spring retracts it.

In order to latch the pin 70 in a projected position a ball clutch latching means is provided for cooperation with the actuating plunger. This comprises a plurality of balls 84 disposed within outwardly convergent inclined grooves 85 within the forward head portion 86 of the sleeve 80, the balls being disposed in surrounding relation to the plunger shank and normally pressed outwardly by a helical compression spring 87 disposed about the shank between the balls and the end of the bearing member 79 to exert gripping pressure upon the shank to thus retain it against retroactive movement following any inward movement while permitting continued inward movement to its limit position. In order to release the balls from the plunger shank to permit its free movement under the action of the spring 82 a sleeve-like bayonet latch member 88 having a knurled flange 89 at its outer end is slidably engaged about the shank within the forward end of the head 86 with its inner end in engagement with the balls and with the knurled flange outwardly spaced from the head. A bayonet slot 90 provided in the latch member 88 is engaged by a set screw 91 provided in the head 86, which limits the outward movement of the latching member under the pressure of the spring 87 in the latching position of the balls, and which is adapted to be interlockingly engaged with the bayonet slot upon inward and partial rotary movement of the latching member to engage the circumferential portion of the slot with the set screw to thus secure the latching member in its inwardly pressed position to release the balls and permit free movement of the plunger. By partially rotating the latching member to bring the longitudinal portion of the bayonet slot into line with the set screw the latching member will spring to its latched position under the pressure of the spring 87, the balls at the same time being pressed by the spring along the inclined slots 85 into clutching relation with the plunger shank 76.

As seen in FIG. 1 the locking spring means comprising the leaf spring and hair spring is in a normal position out of locking engagement with the periphery of the rotor disk 10. Assuming the meter is energized by the current to be measured and the pointer 17 moves from its normal full line position to an indicating position as shown in dot-and-dash lines, and further assuming that it is desired to hold the pointer in the indicating position for the purpose of photographing or otherwise making a record of the reading, the operator presses the plunger of the cable release unit causing the cam tip 70a of the pin 70 to move from the full line position as seen in FIG. 3 to the dot-and-dash line position, where it engages the side of the leaf spring remote from the disk and forces it inwardly to the dot-and-dash line position as seen in FIGS. 1 and 3 to engage the hair spring with the periphery of the disk to lock it.

With the clutch latching member 88 in the outwardly moved position as seen in FIG. 2 the pin 70 will be retained in its projected position and the disk will remain locked until the latching clutch member is depressed to its plunger releasing position. This is brought about by pressing the latch member inwardly from the position as seen in FIG. 2 and partially rotating it to engage the circumferential portion of the bayonet slot 90 with the set screw 91, thus releasing the plunger to allow it to project under the pressure of the spring 82 and at the same time retracting the pin 70. If it is desired to hold the position of the pointer only while the plunger is manually depressed, the clutch latching member 88 may first be placed in its non-clutching position, so that as soon as the thumb pressure is removed from the plunger it will move to its projected position under the pressure of the spring 82, at the same time moving the pin 70 to its retracted position.

In FIG. 7 there is shown a modified leaf spring 54a having a portion 92 bent on an angular plane to act as a cam to deflect the spring upon engagement by the pin 70.

In FIG. 8 there is illustrated a modification wherein the locking spring means is normally in locking engagement with the disk 10 and is adapted to be moved to unlocking position by projection of the pin 70 of the cable release unit. In this case the normal position of the leaf spring 54b is such that the axis of the pin 70 is at the disk side of the spring so that upon projection of the pin its cam tip will engage the disk side of the spring and move it to the dot-and-dash line position with the hair spring 57 out of contact with the periphery of the disk. In this embodiment the bends 55b and 56b of the leaf spring and the orientation of the slot 53 of the post 47 are in a slightly different arrangement from that of the embodiment shown in FIGS. 1–4. The spring 54b can, if desired, have a cam portion on its side remote from the disk similar to the cam portion 92 shown in FIG. 7.

While the invention has been described with particular reference to an electrical panel meter it is pointed out that the invention also contemplates photographic light meters as well as other types of meters or measuring instruments embodying a rotor disk of the type contemplated by the invention.

We claim:

1. A pointer lock for indicating instruments comprising, in combination:
   (A) a casing,
   (B) a visually exposed scale carried by said casing and subtending a predetermined scale angle of arc about a pivoting axis passing through the casing,
   (C) a meter movement carried by said casing, and including
      (1) a pivotally mounted rotor disk having an elongated radial pointer movable in indicating relation to said scale, and
      (2) axial mounting means for mounting the rotor disk in the casing for substantially frictionless pivoting movement about said pivoting axis,
   (D) locking spring means including
      (1) a first spring anchored at one end in said casing for flexing movement parallel to the plane of said disk and having its free end laterally opposed to the periphery of said disk, and
      (2) a second spring secured to the disk side of said first spring extending perpendicularly to the plane of said disk for engagement with the periphery of said disk at an intermediate point of said second spring upon movement of said first spring toward said disk,
   (E) a fitting mounted in said casing having a passage opening to the interior and exterior of said casing with its axis disposed at one side of said first spring, and
   (F) a flexible cable release unit connectable to said fitting externally of said casing and including
      (1) a pin at one end of said cable release unit adapted to have projecting and retracting movement in said passage and having a tip which upon projection of said pin engages at one side of said first spring to move it laterally against the inherent tension of said first spring from a normal to an actuated position, whereby in one of said positions said second spring is in locking engagement with the periphery of said disk and in the other of said positions said second spring is in separated non-locking position relatively to said periphery, and
      (2) an actuating plunger at the other end of said cable release unit for imparting projecting and retracting movement to said pin.

2. The combination as defined in claim 1, wherein said first spring is a leaf spring having its width dimension perpendicularly to the plane of said disk.

3. The combination as defined in claim 1, wherein said second spring is a convexly arched hair spring.

4. The combination as defined in claim 1, wherein said first spring is a leaf spring having its width dimension perpendicularly to the plane of said disk, and said second spring is a convexly arched hair spring.

5. The combination as defined in claim 1, wherein said first spring is a leaf spring having its width dimension perpendicularly to the plane of said disk, and said second spring is a convexly arched hair spring secured at both ends to said leaf spring at equally spaced points at each side of the plane of said disk, whereby upon engagement with the periphery of said disk the intermediate portion of said hair spring is adapted to be concavely flexed toward said leaf spring.

6. The combination as defined in claim 1, wherein said first spring is a leaf spring having its width dimension perpendicularly to the plane of said disk and wherein said second spring is a convexly arched hair spring secured at one end to said leaf spring at one side of the plane of said disk, its other end being free and disposed at the other side of the plane of said disk, whereby upon engagement with the periphery of said disk said hair spring is adapted to be flexed toward said leaf spring.

7. The combination as defined in claim 1, wherein first spring is a leaf spring having its width dimension perpendicular to the plane of said disk and having at least two spaced bends intermediate its ends extending transversely of its length, and wherein the point of engagement of said pin with said leaf spring is intermediate said bends.

8. The combination as defined in claim 1, wherein said second spring is normally out of locking engagement with the periphery of said disk, and wherein the axis of said pin is at the side of said first spring remote from said disk.

9. The combination as defined in claim 1, wherein said second spring is normally in locking engagement with the periphery of said disk, and wherein the axis of said pin is at the disk side of said first spring.

10. The combination as defined in claim 1, wherein said cable release unit includes spring means spring-loading said plunger and pin to normally retract said pin.

11. The combination as defined in claim 1, wherein said cable release unit includes spring means spring-loading said plunger and pin to normally retract said pin, clutch means co-operating with plunger and movable between a normal clutching position for restraining retractive movement of said pin and a non-clutching position permitting free projecting and retracting movement in said non-clutching position, and releasable means for retaining said clutch means in non-clutching position.

12. The combination as defined in claim 1 wherein the tip of said pin constitutes a cam for laterally deflecting said first spring.

13. The combination as defined in claim 1, wherein said first spring has a cam portion disposed in an angular plane relatively to its vertical plane.

14. A pointer lock for indicating instruments comprising, in combination:
   (A) a casing,
   (B) a visually exposed scale carried by said casing and subtending a predetermined scale angle of arc about a pivoting axis passing through the casing,
   (C) a meter movement carried by said casing, and including a permanent magnet with
      (1) a pivotally mounted rotor disk having a conductive coil positioned thereon and an elongated radial pointer movable in indicating relation to said scale, and
      (2) axial mounting means for mounting the rotor disk adjustment said magnet in the casing for substantially frictionless pivoting movement about said pivoting axis, while connecting the current to be measured to said conductive coil,
   (D) locking spring means including
      (1) a first spring anchored at one end in said casing for flexing movement parallel to the plane of said disk and having its free end laterally opposed to the periphery of said disk, and (2) a second spring extending perpendicularly to the plane of said disk for engagement with the periphery of said disk at an intermediate point of said second spring upon movement of said first spring toward said disk, (E) a fitting mounted in said casing having a passage opening to the interior and exterior of said casing with its axis disposed at one side of said first spring, and (F) a flexible cable release unit connected to said fitting externally of said casing and including (1) a pin at one end of said cable release unit adapted to have projecting and retracting movement in said passage and having a tip which upon projection of said pin engages at one side of said first spring to move it laterally against the inherent tension of said first spring from a normal to an actuated position, whereby in one of said positions said second spring is in locking engagement with the periphery of said disk and in the other of said positions said first spring is in separated non-locking position relatively to said periphery, and (2) an actuating plunger at the other end of said cable release unit for imparting projecting and retracting movement to said pin.

References Cited
UNITED STATES PATENTS

| | | | |
|---|---|---|---|
| 2,185,312 | 1/1940 | Reimuller | 324—125 X |
| 2,994,256 | 8/1961 | La Rue et al. | 88—23 X |
| 3,063,336 | 11/1962 | Winkler | 88—23 |
| 3,087,380 | 4/1963 | Greger | 324—157 |
| 3,287,990 | 11/1966 | Ellinger | 74—501 |

RUDOLPH V. ROLINEC, *Primary Examiner.*

P. A. URIBE, *Assistant Examiner.*